United States Patent
Hoßbach et al.

(10) Patent No.: US 10,677,096 B2
(45) Date of Patent: Jun. 9, 2020

(54) TURBOCHARGER

(71) Applicant: MAN DIESEL & TURBO SE, Augsburg (DE)

(72) Inventors: Björn Hoßbach, Diedorf (DE); Santiago Uhlenbrock, Gräfenberg (DE); Stefan Rost, Augsburg (DE)

(73) Assignee: MAN Energy Solutions SE, Augsburg (DE)

( * ) Notice: Subject to any disclaimer, the term of this patent is extended or adjusted under 35 U.S.C. 154(b) by 147 days.

(21) Appl. No.: 15/905,462

(22) Filed: Feb. 26, 2018

(65) Prior Publication Data

US 2018/0245481 A1    Aug. 30, 2018

(30) Foreign Application Priority Data

Feb. 27, 2017 (DE) .................. 10 2017 103 980

(51) Int. Cl.
| | |
|---|---|
| *F02C 6/12* | (2006.01) |
| *F01D 25/24* | (2006.01) |
| *F01D 25/14* | (2006.01) |
| *F01D 9/02* | (2006.01) |
| *F01D 25/26* | (2006.01) |

(52) U.S. Cl.
CPC ........... *F01D 25/243* (2013.01); *F01D 9/026* (2013.01); *F01D 25/145* (2013.01); *F01D 25/26* (2013.01); *F02C 6/12* (2013.01); *F05D 2220/40* (2013.01); *F05D 2260/231* (2013.01)

(58) Field of Classification Search
None
See application file for complete search history.

(56) References Cited

U.S. PATENT DOCUMENTS

| | | | | |
|---|---|---|---|---|
| 5,528,902 A | * | 6/1996 | Hoerl ................... | F01D 25/145 417/407 |
| 5,863,178 A | * | 1/1999 | Scheinert ............... | F01D 25/30 415/58.4 |
| 2002/0085932 A1 | * | 7/2002 | Loffler .................... | F01D 9/026 417/407 |
| 2003/0206798 A1 | * | 11/2003 | Allmang ................. | F01D 9/026 415/200 |
| 2010/0316494 A1 | * | 12/2010 | Gru mann ............... | F01D 25/26 415/231 |
| 2011/0120124 A1 | * | 5/2011 | Czerwinski .......... | F01D 17/165 60/605.1 |
| 2011/0236191 A1 | * | 9/2011 | Grußmann ............ | F01D 25/243 415/177 |

(Continued)

FOREIGN PATENT DOCUMENTS

| | | |
|---|---|---|
| DE | 11 2014 002 067 | 11/2017 |
| JP | 2002 004 871 | 1/2002 |

(Continued)

*Primary Examiner* — Michael Lebentritt
(74) *Attorney, Agent, or Firm* — Cozen O'Connor

(57) ABSTRACT

A turbocharger with a turbine for expanding a first medium and a compressor for compressing a second medium utilizing energy extracted in the turbine during the expansion of the first medium. The turbine comprises a turbine housing and a turbine rotor. The turbine housing is connected to a bearing housing. An inflow housing of the turbine housing is formed in a double-walled manner, namely of an inner flow-conducting core and an outer force-conducting shell.

10 Claims, 2 Drawing Sheets

(56) References Cited

U.S. PATENT DOCUMENTS

| | | | |
|---|---|---|---|
| 2011/0318177 A1* | 12/2011 | Botsch | F01D 25/246 |
| | | | 415/208.1 |
| 2012/0102737 A1* | 5/2012 | Smatloch | B23P 15/00 |
| | | | 29/888.02 |
| 2013/0064656 A1* | 3/2013 | Smatloch | F01D 9/026 |
| | | | 415/182.1 |
| 2013/0129479 A1* | 5/2013 | Daut | F01D 25/125 |
| | | | 415/110 |
| 2013/0156567 A1* | 6/2013 | Nagae | F01D 25/24 |
| | | | 415/205 |
| 2013/0223996 A1* | 8/2013 | Parker | F01D 17/141 |
| | | | 415/151 |
| 2013/0302159 A1* | 11/2013 | Grussmann | F01D 25/243 |
| | | | 415/215.1 |
| 2014/0037436 A1* | 2/2014 | Tabata | F01D 25/24 |
| | | | 415/178 |
| 2014/0322003 A1* | 10/2014 | Isogai | F02C 6/12 |
| | | | 415/204 |
| 2015/0184542 A1* | 7/2015 | Hiller | F01D 9/026 |
| | | | 415/145 |
| 2016/0273388 A1* | 9/2016 | Yoshida | F01D 9/026 |
| 2016/0356179 A1* | 12/2016 | Tennevall | F01D 25/183 |
| 2017/0114714 A1* | 4/2017 | Niwa | F02B 37/025 |
| 2017/0370225 A1* | 12/2017 | Itoh | F01D 5/046 |
| 2018/0266273 A1* | 9/2018 | Hossbach | F01D 5/043 |
| 2018/0320554 A1* | 11/2018 | Hossbach | F01D 25/243 |
| 2018/0328226 A1* | 11/2018 | Yokoshima | F01D 9/026 |
| 2018/0328373 A1* | 11/2018 | Aynacioglu | F04D 29/023 |

FOREIGN PATENT DOCUMENTS

| | | |
|---|---|---|
| JP | 2007 278 130 | 10/2007 |
| WO | WO 2010/039590 | 4/2010 |

* cited by examiner

TURBOCHARGER

BACKGROUND OF THE INVENTION

1. Field of the Invention

The invention relates to a turbocharger.

2. Description of the Related Art

FIG. 1 shows a cross section through a turbocharger 1 known from practice. The turbocharger 1 shown in FIG. 1 comprises a turbine 2 and a compressor 3. In the turbine 2, a first medium, in particular exhaust gas of an internal combustion engine, is expanded. Energy extracted in the process is utilized in the compressor 3 of the turbocharger 1 to compress a second medium, in particular charge air, to be fed to the internal combustion engine.

The turbine 2 of the turbocharger 1 comprises a turbine housing 4 and a turbine rotor 5.

The compressor 3 of the turbocharger 1 comprises a compressor housing 6 and a compressor rotor 7. The turbine rotor 5 and the compressor rotor 7 are coupled via a shaft 8 mounted in a bearing housing 9. The bearing housing 9 is connected on the one side to the turbine housing and on the other side to the compressor housing 6. Furthermore, FIG. 1 shows an optional silencer 10 that acts on the compressor housing 6 and via which the charge air is conducted.

The turbine housing 4 of the turbine 2 of the turbocharger 1 comprises an inflow housing 11 and an outflow housing 12. By way of the inflow housing 11, the first medium to be expanded is fed to the turbine rotor 5, here in the radial direction. Expanded medium discharged from the turbine rotor 5, flows via the outflow housing 12, here in the axial direction.

In the case of known turbochargers, there is the risk of bursting in the region of the turbine 2, in particular in the region of the inflow housing 11 of the turbine housing 4 of the turbine 2. If the turbine rotor 5 were to burst for example, fragments of the same could strike the inflow housing 11 destroying the same so that a bursting of the inflow housing 11 would also occur. Fragments can then enter the surroundings and constitute a threat to persons or objects present in the surroundings. This reduces the so-called containment safety.

SUMMARY OF THE INVENTION

Starting out from this, one aspect of the present invention is based on the object of creating a new type of turbocharger.

According to one aspect of the invention, an inflow housing of the turbine housing is formed double-walled, namely from an inner, flow-conducting core and an outer, force-conducting shell.

In the turbocharger according to one aspect of the invention, the inflow housing of the turbine housing is embodied in a double-walled manner. The inner core assumes the task of the flow conduction. The outer shell assumes the task of the force conduction. By way of this, the so-called containment safety can ultimately be significantly improved in the region of the turbine 2 compared with turbochargers known from the prior art.

Preferentially, the outer force-conducting shell is split in the axial direction into halves, whereas the inner flow-conducting core is undivided in the axial direction. This configuration is preferred for a simple design embodiment of the turbocharger with improved containment safety.

Preferentially, a radially inner section of a first half of the force-conducting shell and a first radially inner section of the inner flow-conducting core are each attached to and/or adjoin the bearing housing. A radially inner section of a second half of the outer force-conducting shell and a second radially inner section of the inner flow-conducting core are each attached to an insert piece of the turbine housing and/or adjoin the insert piece. These features also serve for the simple design embodiment of a turbocharger with a double-walled inflow housing of the turbine housing and improved containment safety.

According to a further development of the invention, a heat-insulating material is arranged between the inner flow-conducting core and the outer force-conducting shell. By way of this, a heat insulation can be provided in the region of the inflow housing of the turbine housing. This is advantageous both for the operational safety and also to increase the efficiency.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

DETAILED DESCRIPTION OF THE PRESENTLY PREFERRED EMBODIMENTS

Figure 1:
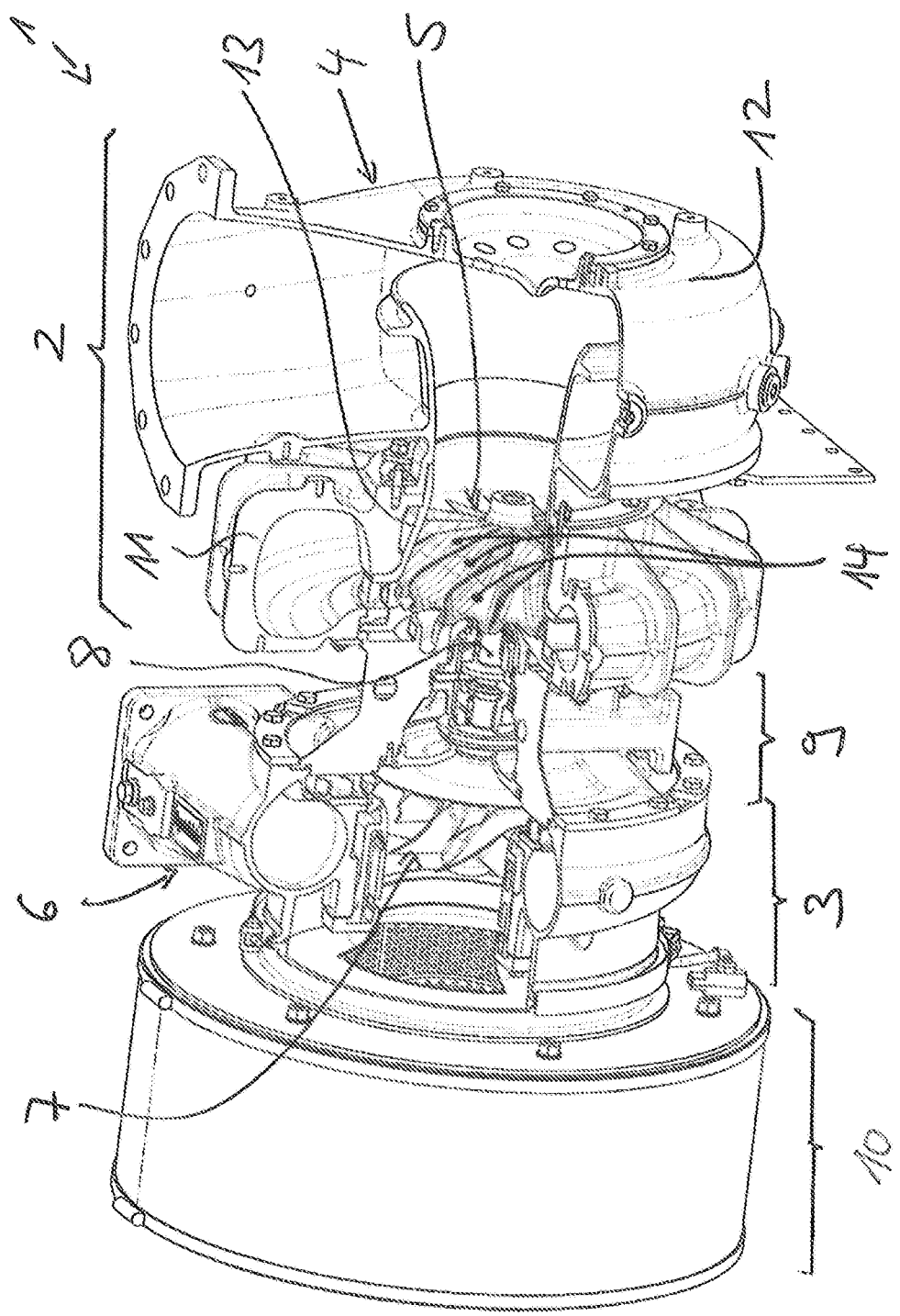
FIG. 1: is a cross section through a turbocharger known from practice.

The invention relates to a turbocharger.

A turbocharger 1 comprises a turbine 2 for expanding a first medium, in particular for expanding exhaust gas of an internal combustion engine. Furthermore, a turbocharger 1 comprises a compressor 3 for compressing a second medium, in particular charge air, namely utilizing energy extracted in the turbine 2 during the expansion of the first medium.

The turbine 2 comprises a turbine housing 4 and a turbine rotor 5. The compressor 3 comprises a compressor housing 6 and a compressor rotor 7. The compressor rotor 7 is coupled to the turbine rotor 5 via a shaft 8 mounted in a bearing housing 9. The bearing housing 9 is positioned between the turbine housing 4 and the compressor housing 6 and is connected both to the turbine housing 4 and the compressor housing 6.

The turbine housing 4 of the turbine 2 comprises an inflow housing 11 and an outflow housing 12. By way of the inflow housing 11, the first medium to be expanded in the region of the turbine 2 can be fed to the turbine rotor 5. By way of the outflow housing 12, first medium expanded in the region of the turbine rotor 5 flows away from the turbine 2.

In addition to the inflow housing 11 and the outflow housing 12, the turbine housing 4 comprises an insert piece 13, wherein the insert piece 13 runs in particular in the region of the inflow housing 11 namely adjacent to the turbine rotor 5 radially outside adjoining moving blades 14 of the turbine rotor 5.

Figure 2:
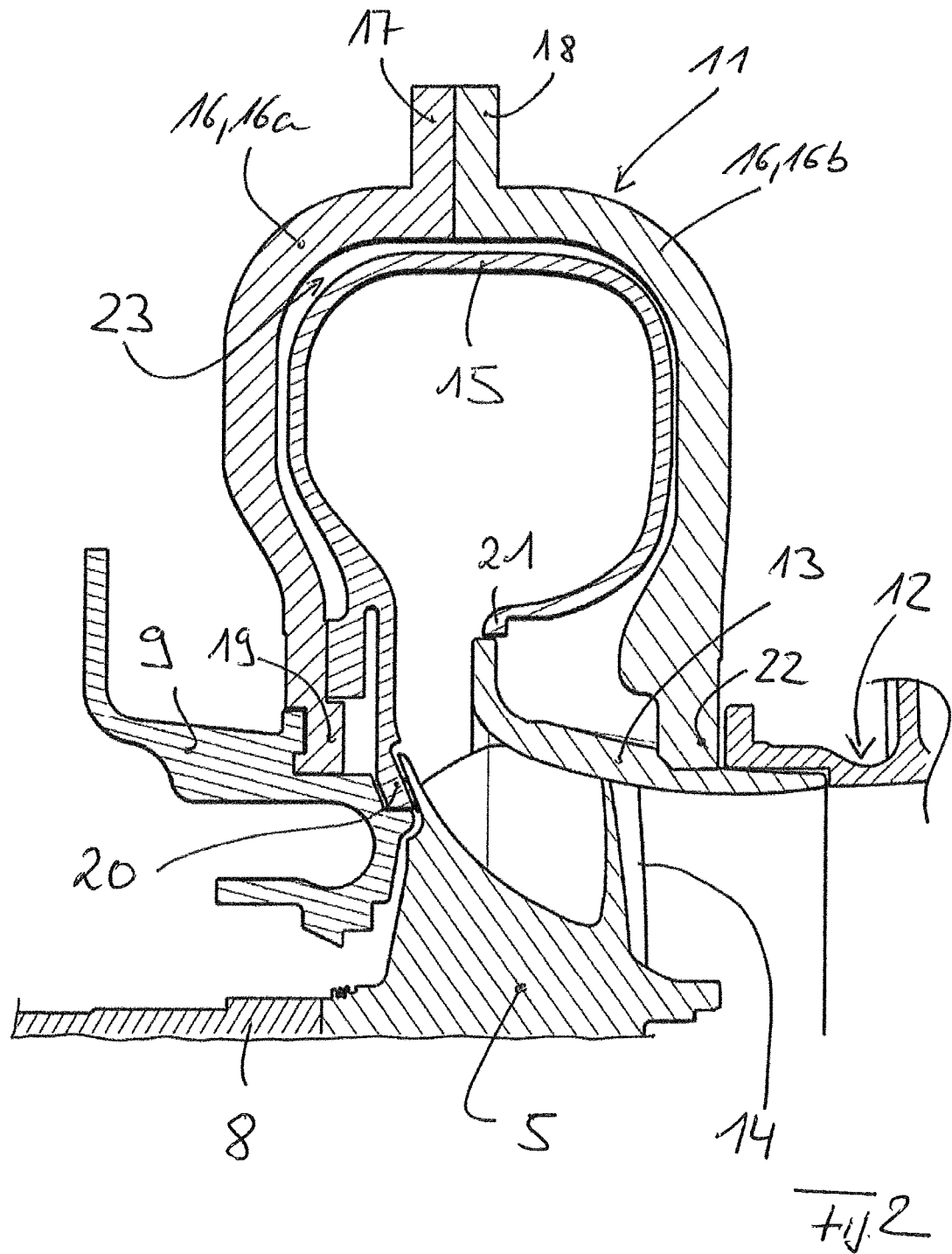
FIG. 2: is a cross section through a turbocharger according to the invention in the region of an inflow housing of the turbine of the turbocharger.

As shown in FIG. 2, the inflow housing 11 of the turbine housing 4 is designed in a double-walled manner and formed by an inner flow-conducting core 15 and an outer force-conducting shell 16.

The inner core 15 assumes the flow conducting function for conducting the first medium to be expanded in the direction of the turbine rotor 5, the outer shell 16 assumes a force-conducting function.

The outer force-conducting shell 16 is split seen in axial direction of the turbine 2 or of the turbocharger 1 into halves 16a, 16b. At radially outer ends, these two halves 16a, 16b of the outer force-conducting shell 16 are connected to one another at flanges 17, 18. At radially inner ends or sections 19, 22, the two halves 16a, 16b are attached to the bearing housing 9 or to the insert piece 13 and/or adjoin these assemblies. Accordingly, the half 16a with the radially inner section 19 is in engagement with the bearing housing 9, while the insert piece 13 adjoins the radially inner section 22 of the half 16b.

The inner flow-conducting core 15 surrounded by the shell 16 is undivided in the axial direction. Radially inner sections 20, 21 of the same adjoin the bearing housing 9 on the one side and the insert piece 13 on the other side, namely the radially inner section 20 adjoins the bearing housing 9 and the radially inner section 21 adjoins the insert piece 13.

Between the inner flow-conducting core 15 and the outer force-conducting shell 16 a hollow space 23 is formed. According to an advantageous further development, a heat-insulating material is arranged in the hollow space 23 between the inner core 15 and the outer shell 16.

In the turbocharger 1 according to one aspect of the invention, the inflow housing 2 is accordingly embodied in a double-walled manner. Force conduction function and flow conduction function are assumed by two separate components and thus separated from one another. In particular, the containment safety can thereby be increased. By arranging a heat-insulating material in the hollow space 23 between core 15 and shell 16, the efficiency can be increased furthermore.

For example, a ceramic foam or mineral wool can be employed as heat-insulating material. In order to improve the containment safety, the heat-insulating material can be embedded in a multi-layered matrix structure. Alternatively or additionally, a heat pipe can be arranged in the hollow space in order to steer a temperature line in a certain direction in the turbocharger. As materials for the heat pipe, mostly copper, for example a copper wire braiding, is mostly employed in the lower temperature ranges since it is easily shapeable and has a high heat conductivity. In the case of high-temperature heat pipes, heat-resistant steels or nickel-based alloys are mainly employed.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A turbocharger, comprising:
   a shaft;
   a turbine configured to expand a first medium, comprising:
      a turbine rotor;
      a turbine housing, wherein the turbine housing is a double-walled inflow housing having an inner flow-conducting core that is undivided in the axial direction and an outer force-conducting shell, wherein the outer force-conducting shell is split into two halves in an axial direction;
   a compressor configured to compress a second medium utilizing energy extracted in the turbine during expansion of the first medium, comprising:
      a compressor housing; and
      a compressor rotor that is coupled to the turbine rotor via the shaft; and
   a bearing housing arranged between and connected to both the turbine housing and the compressor housing.

2. The turbocharger according to claim 1, wherein a section of a first half of the outer force-conducting shell and a first section of the inner flow-conducting core are each at least one of: attached to the bearing housing and adjoin the bearing housing.

3. The turbocharger according to claim 2, wherein a section of a second half of the outer force-conducting shell and a second section of the inner flow-conducting core are each at least one of:
   attached to an insert piece of the turbine housing and
   adjoin the insert piece of the turbine housing.

4. The turbocharger according to claim 3, wherein the halves of the outer force-conducting shell have respective flanges by which the halves of the outer force-conducting shell are attached to one another.

5. The turbocharger according to claim 4, further comprising:
   a heat-insulating material arranged in a hollow space between the inner flow-conducting core and the outer force-conducting shell.

6. The turbocharger according to claim 1, wherein the inner flow-conducting core is undivided in an axial direction.

7. The turbocharger according to claim 1, wherein a section of a first half of the outer force-conducting shell and a first section of the inner flow-conducting core are each at least one of:
   attached to the bearing housing and
   adjoin the bearing housing.

8. The turbocharger according to claim 1, wherein a section of a second half of the outer force-conducting shell and a second section of the inner flow-conducting core are each at least one of:
   attached to an insert piece of the turbine housing and
   adjoin the insert piece of the turbine housing.

9. The turbocharger according to claim 1, wherein the halves of the outer force-conducting shell have respective flanges by which the halves of the outer force-conducting shell are attached to one another.

10. The turbocharger according to claim 1, further comprising: a heat-insulating material arranged in a hollow space between the inner flow-conducting core and the outer force-conducting shell.

\* \* \* \* \*